(12) United States Patent
Wild et al.

(10) Patent No.: US 8,010,142 B2
(45) Date of Patent: Aug. 30, 2011

(54) METHOD AND APPARATUS FOR INCLUDING A RECORDING DEVICE IN A PUSH-TO-TALK OVER CELLULAR COMMUNICATION SESSION

(75) Inventors: Johanna A. Wild, Munich (DE); Dwight R. Smith, Grapevine, TX (US)

(73) Assignee: Motorola Solutions, Inc., Schaumburg, IL (US)

( * ) Notice: Subject to any disclaimer, the term of this patent is extended or adjusted under 35 U.S.C. 154(b) by 1013 days.

(21) Appl. No.: 11/338,016

(22) Filed: Jan. 24, 2006

(65) Prior Publication Data
US 2006/0171351 A1    Aug. 3, 2006

Related U.S. Application Data

(60) Provisional application No. 60/648,674, filed on Jan. 31, 2005.

(51) Int. Cl.
*H04B 7/00* (2006.01)

(52) U.S. Cl. ........ 455/518; 455/517; 455/519; 455/520; 455/90.2

(58) Field of Classification Search .................. 455/90.2, 455/412.1, 414.1, 416, 517–520, 78, 79, 455/500, 426.1, 422.1, 420; 370/352, 389, 370/338, 328
See application file for complete search history.

(56) References Cited

U.S. PATENT DOCUMENTS

| 7,155,207 B2* | 12/2006 | Chapman et al. ............. 455/410 |
| 7,227,930 B1* | 6/2007 | Othmer et al. .................. 379/85 |
| 7,277,720 B2* | 10/2007 | Lazaridis ....................... 455/517 |
| 7,398,079 B2* | 7/2008 | Munje ......................... 455/412.1 |
| 7,499,720 B2* | 3/2009 | Idnani ............................ 455/519 |
| 2002/0160751 A1* | 10/2002 | Sun et al. ....................... 455/412 |
| 2003/0235184 A1* | 12/2003 | Dorenbosch et al. .......... 370/352 |
| 2004/0008680 A1* | 1/2004 | Moss et al. .................... 370/390 |
| 2004/0171400 A1 | 9/2004 | Rosen et al. |
| 2004/0224710 A1 | 11/2004 | Koskelainen et al. |

(Continued)

FOREIGN PATENT DOCUMENTS

DE    2004020533 A1    4/2004

OTHER PUBLICATIONS

PCT International Search Report Dated Aug. 11, 2006 for Counterpart Application (References Previously Cited).

(Continued)

*Primary Examiner* — Dominic E Rego
(74) *Attorney, Agent, or Firm* — Steven A. May; Valerie M. Davis

(57) ABSTRACT

A communication system provides for an informing of participants in a Push-to-Talk over Cellular (PoC) communication session that the session is being recorded by a recording device, for a storage, by the recording device, of media that conveyed during the session, and for a subsequent retrieval of the stored media from the recording device. In various embodiments of the invention, a host of the communication session is permitted to determine whether or not the recording device is permitted access to the communication session, and the other participants in the session are able to determine whether to remain in the session when the recording device is permitted access. A user of an MS on behalf of whom the recording device is participating is then able to retrieve the stored media along with information identifying a source of the media and a time associated with the storage of the media.

21 Claims, 8 Drawing Sheets

U.S. PATENT DOCUMENTS

| | | | |
|---|---|---|---|
| 2004/0249949 A1* | 12/2004 | Gourraud et al. | 709/227 |
| 2005/0143135 A1* | 6/2005 | Brems et al. | 455/564 |
| 2005/0286517 A1* | 12/2005 | Babbar et al. | 370/389 |
| 2008/0026701 A1* | 1/2008 | Lazaridis | 455/90.2 |

OTHER PUBLICATIONS

German Office Action Dated Mar. 9, 2011 for Counterpart Application.

* cited by examiner 120, 140, 160, 170:
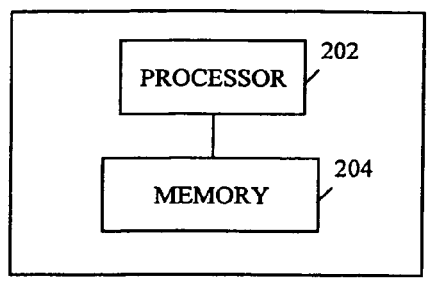
122, 142, 162:
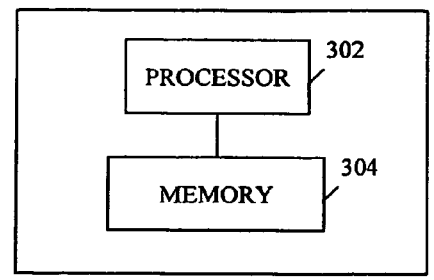
FIG. 2
FIG. 3
102-104:
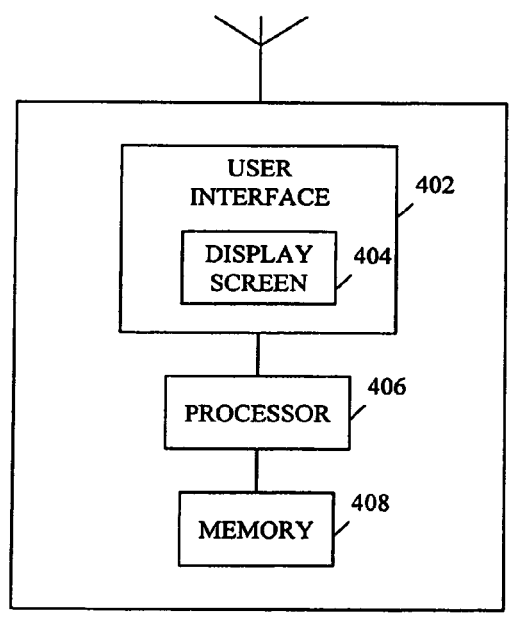
FIG. 4

METHOD AND APPARATUS FOR INCLUDING A RECORDING DEVICE IN A PUSH-TO-TALK OVER CELLULAR COMMUNICATION SESSION

CROSS-REFERENCE TO RELATED APPLICATION

This application claims priority from provisional application Ser. No. 60/648,674, entitled "METHOD AND APPARATUS FOR INCLUDING A RECORDING DEVICE IN A PUSH-TO-TALK OVER CELLULAR COMMUNICATION SESSION," filed Jan. 31, 2005, which is commonly owned and incorporated herein by reference in its entirety.

FIELD OF THE INVENTION

The present invention relates generally to cellular communication systems, and, in particular, to provision of Push-to-Talk services in a cellular communication system.

BACKGROUND OF THE INVENTION

Recently it has been proposed to add Push-to-Talk over Cellular (PoC) services to Code Division Multiple Access (CDMA) communications systems, such as a cdma2000 communication system. Unlike the full duplex interconnect services provided by today's cellular systems, Push-to-Talk (PTT) services are half-duplex services that traditionally have been provided by two-way radio systems. Traditional PTT services typically allow for instant access by a mobile station that is hosting a call to a target mobile station. For example, a dispatch group call service enables a user to communicate with a group of people simultaneously and instantaneously, typically by depressing a PTT key.

When a user of a PoC-enabled cellular phone is invited to participate in a PoC communication session, the user may want to participate in the session even though the user is unavailable for direct communications. For example, the user's cellular phone may be powered down or the user may have roamed to a network that does not support PoC services. In such an instance, the user may indirectly participate in the PoC communication session by subscribing to a voicemail-type service and registering for the service when the user is unavailable for direct communications. When the user is then invited to participate in a PoC communication session, the PoC communication session will be directed to a recording device, such as a voice mailbox, associated with the user.

However, in some countries, voice communications may be recorded during a phone call only with the consent of the speaker. Current PoC protocols do not provide a mechanism for obtaining such consent from a speaker, nor do they provide a mechanism for retrieving and managing such recorded voice by a PoC-enabled cellular phone.

Therefore, a need exists for a method and apparatus that provides for obtaining consent from a speaker to record the speaker's voice during a PoC communication session and for retrieving and managing such recorded voice by a PoC-enabled cellular phone.

BRIEF DESCRIPTION OF THE DRAWINGS

FIG. 2 is a block diagram of a Push-to-Talk over Cellular (PoC) Server of FIG. 1 in accordance with an embodiment of the present invention.

FIG. 3 is a block diagram of a recording device of FIG. 1 in accordance with an embodiment of the present invention.

FIG. 4 is a block diagram of a PoC-enabled mobile station of FIG. 1 in accordance with an embodiment of the present invention.

DETAILED DESCRIPTION OF THE INVENTION

Figure 1:
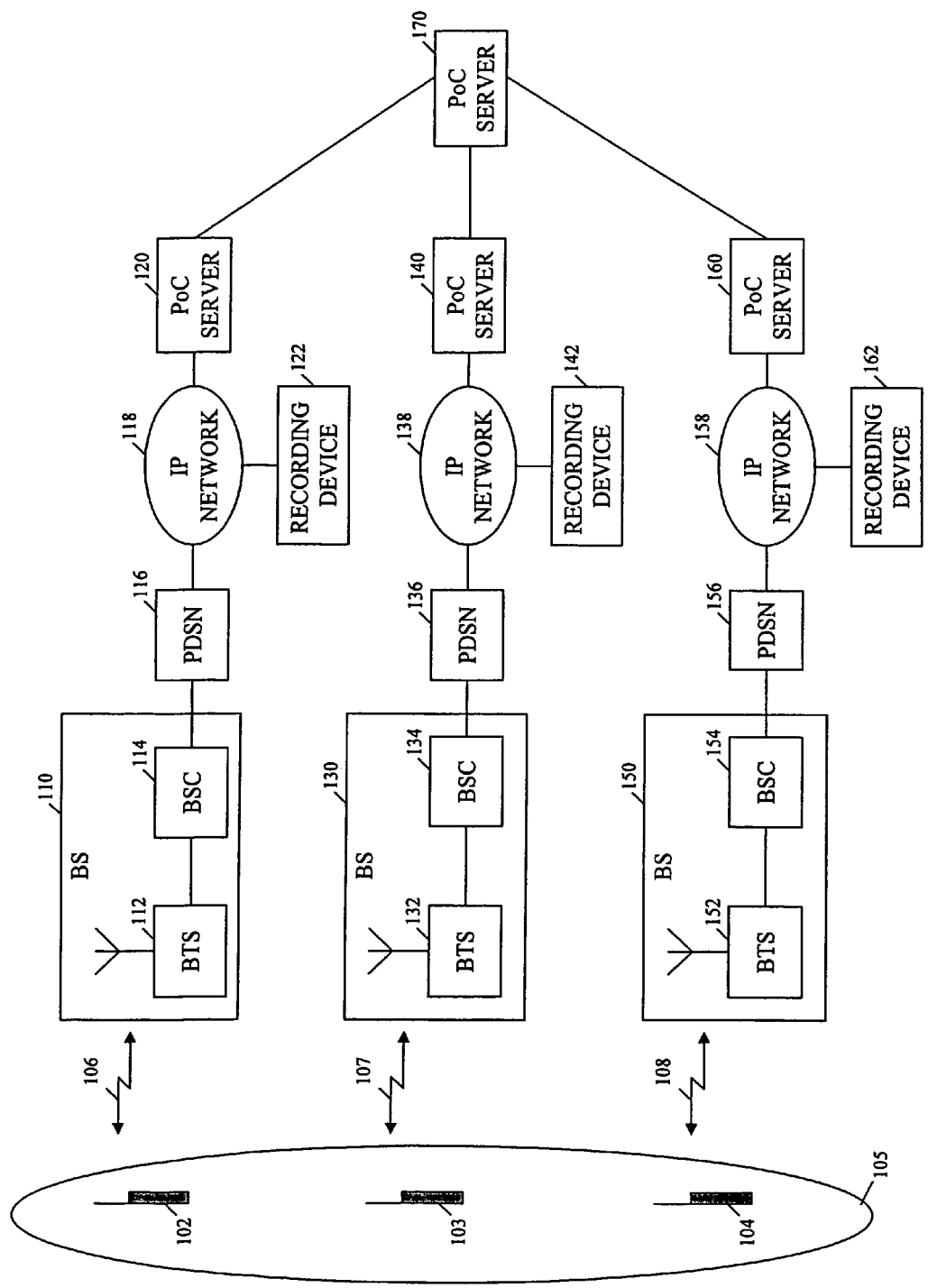
FIG. 1 is a block diagram of a wireless communication system in accordance with an embodiment of the present invention.

To address the need for a method and apparatus that provides for obtaining consent from a speaker to record the speaker's voice during a Push-to-Talk over Cellular (PoC) communication session and for retrieving and managing such recorded voice by a PoC-enabled cellular phone, a communication system is provided that provides for an informing of participants in a PoC communication session that the session is being recorded by a recording device, for a storage, by the recording device, of media that conveyed during the session, and for a subsequent retrieval of the stored media from the recording device. A host of the communication session is permitted to determine whether or not the recording device is permitted access to the communication session, and the other participants in the session are able to determine whether to remain in the session when the recording device is permitted access. A user of a mobile station (MS) on behalf of whom the recording device is participating is then able to retrieve the stored media along with information identifying a source of the media and a time associated with the storage of the media. The user of the MS associated with the recording device may retrieve the information during a one-on-one PoC communication session with the recording device or during a group call, thereby permitting others to review the stored media when it is retrieved. Further, the communication system provides for the user of the MS associated with the recording device to dispose of the stored media as the the user sees fit.

Generally, an embodiment of the present invention encompasses a method for establishing a PoC communication session in a wireless communication system. The method includes receiving a request by a host mobile station to invite a target mobile station to a PoC communication session, establishing the PoC communication session with the host mobile station and with a recording device associated with the target mobile station, informing the host mobile station that the recording device has been added to the PoC communication session, and receiving, from the host mobile station, an acceptance or a rejection of access of the recording device to the PoC communication session.

Another embodiment of the present invention encompasses a method for wirelessly retrieving media stored as part of a Push-to-Talk over Cellular (PoC) communication session in a wireless communication system. The method includes receiving a request by a host mobile station to initiate invite a recording device to a PoC communication session and establishing the PoC communication session with the host mobile station and with a the recording device, wherein the recording device is capable of storing media in association with the host mobile station. The method further includes granting a floor of the PoC communication session to the recording device, receiving the stored media from the recording device, and forwarding the stored media to the host mobile station.

Yet another embodiment of the present invention encompasses a PoC Server that includes a means for receiving a request by a host mobile station to initiate invite a target mobile station to a PoC communication session, a means for establishing the PoC communication session with the host mobile station and with a recording device associated with the target mobile station, a means for informing the host mobile station that the recording device has been added to the PoC communication session, and a means for receiving, from the host mobile station, an acceptance or a rejection of access of the recording device to the PoC communication session.

Still another embodiment of the present invention encompasses a PoC Server that includes a means for receiving a request by a host mobile station to initiate invite a recording device to a PoC communication session, a means for establishing the PoC communication session with the host mobile station and with a the recording device, wherein the recording device is capable of storing media in association with the host mobile station, a means for granting a floor of the PoC communication session to the recording device, a means for receiving the stored media from the recording device, and a means for forwarding the stored media to the host mobile station.

The present invention may be more fully described with reference to FIGS. 1-10. FIG. 1 is a block diagram of a wireless communication system 100 in accordance with an embodiment of the present invention. Communication system 100 includes multiple Base Stations (BSs) 110, 130, 150 (three shown). Each BS of the multiple BSs 110, 130, 150 includes a respective Base Transceiver Station (BTS) 112, 132, 152 that is operably coupled to a respective Base Station Controller (BSC) 114, 134, 154. Each BS 110, 120, 130 is operably coupled to a respective Packet Data Service Node (PDSN) 116, 136, 156, and, via the PDSN and a respective Internet Protocol (IP) core network 118, 138, 158, to a respective Push-to-Talk over cellular (PoC) Server 120, 140, 160. In addition, when one or more of MSs 102-104 is engaged in a PoC communication session, another PoC Server 170 may act as the controlling PoC server for the call. However, in other embodiments of the present invention, the functions performed herein by PoC Server 170 may be performed by a controlling PoC Server function in any one of PoC Servers 120, 140, and 160.

Each of PoC Servers 120, 140, 160 is further coupled, via a respective Internet Protocol (IP) core network 118, 138, 158, to a respective recording device 122, 142, 162, capable of recording any kind of media, such as voice, images, or streaming video, that can be recorded and retrieved for replay. For example, with respect to voice, a recording device 122, 142, 162 may comprise a Voicemail Machine that provides voicemail-type services for MSs serviced by the associated PoC Server. Preferably, each recording device 122, 142, 162 resides on a web-based server and provides recording services for each MS serviced by the associated PoC Server. Each recording device 122, 142, 162 is associated with a network address, such as an Internet Protocol (IP) address or a URL (Universal Resource Locator).

Communication system 100 further comprises multiple PoC-enabled mobile stations (MSs) 102, 103, 104 (three shown) that are each a member of a talkgroup 105. Each MS 102, 103, 104 is in wireless communication with a respective home network comprising a respective BS 110, 130, 150, a respective PDSN 116, 136, 156, a respective PoC Server 120, 140, 160, and a respective recording device 122, 142, 162. However, those who are of ordinary skill in the art realize that two or more of MSs 102-104 may be serviced by a same BS, PDSN, PoC Server, and/or recording device, rather than being serviced by a separate BS, PDSN, PoC Server, and recording device, without departing from the spirit and scope of the present invention. Each BS 110, 130, 150 provides communications services to a respective MS 102, 103, 104 via a respective air interface 106, 107, 108 that includes a forward link and a reverse link.

Each PoC Server 120, 140, 160, 170 is in communication with a Group and List Management Server (GLMS) (not shown). The GMLS manages talkgroups and lists, for example, contact and access lists, that are needed for the PoC service. More particularly, the GLMS provides list management operations to create, modify, retrieve and delete talkgroups, such as talkgroup 105, and lists for authorized users, provides storage for talkgroups and lists, and provides notifications of modifications to the talkgroups and lists. Each talkgroup includes a talkgroup identifier that is uniquely associated with the talkgroup and, in association with the talkgroup identifier, a list of PoC Addresses, such as an e-mail address, IP address, DNS name, or canonical telephone number, that are uniquely associated with MSs, such as MSs 102-104, that are members of the talkgroup. For example, a PoC Address may comprise a Session Initiation Protocol (SIP) Universal Resource Identifier or Locator (URI or URL), for example, SIP: someone@example.com, or may comprise a Telephone (TEL) URI or URL, for example, an international number such as TEL: +1-425-555-0123 or a local number that uses a local dialing plan and prefix. When an inquiry to the GLMS specifies a talkgroup identifier, that is, requests a definition of a specified talkgroup, in response the GLMS provides a list of PoC Addresses associated with the members of the specified talkgroup. For example, in response to an inquiry specifying a talkgroup identifier associated with talkgroup 105, the GLMS may provide the PoC Addresses associated with MSs 102-104. When a PoC Server 120, 140, 160 detects a group call initiation by a respective member of a talkgroup, such as one of MSs 102-104 with respect to talkgroup 105, the PoC Server automatically attempts to connect all of the members of the group in a group call.

FIG. 2 is a block diagram of a PoC Server 120, 140, 160, 170 in accordance with an embodiment of the present invention. Each PoC Server 120, 140, 160, 170 includes a processor 202, such as one or more microprocessors, microcontrollers, digital signal processors (DSPs), combinations thereof or such other devices known to those having ordinary skill in the art. Each PoC Server 120, 140, 160, 170 further includes at least one memory device 204 associated with processor 202, such as random access memory (RAM), dynamic random access memory (DRAM), and/or read only memory (ROM) or equivalents thereof, that store data and programs, such as group call programs, that may be executed by the processor and that allow the PoC Server to perform all functions necessary to operate in communication system 100.

FIG. 3 is a block diagram of a recording device 122, 142, 162 in accordance with an embodiment of the present invention. Each recording device 122, 142, 162 includes a processor 302, such as one or more microprocessors, microcontrollers, digital signal processors (DSPs), combinations thereof or such other devices known to those having ordinary skill in the art. Each recording device 122, 142, 162 further includes at least one memory device 304 associated with processor 302, such as random access memory (RAM), dynamic random access memory (DRAM), and/or read only memory (ROM) or equivalents thereof, that store data and programs that may be executed by the processor and that allow the recording device to perform all functions necessary to operate in communication system 100. The at least one memory device 304 of each recording device 122, 142, 162 is further capable of storing media conveyed to the recording device by MSs serviced by the recording device. Media conveyed to the recording device by an MS is stored in association with, and may be accessed by providing to the recording device, and in particular to processor 302 of the recording device, an access code assigned to the MS.

FIG. 4 is a block diagram of a mobile station (MS), such as MSs 102-104, in accordance with an embodiment of the present invention. Each MS of the multiple MSs 102-104 includes a user interface 402 coupled to a processor 406, such as one or more microprocessors, microcontrollers, digital signal processors (DSPs), combinations thereof or such other devices known to those having ordinary skill in the art. Each MS further includes at least one memory device 408 associated with processor 406, such as random access memory (RAM), dynamic random access memory (DRAM), and/or read only memory (ROM) or equivalents thereof, that maintain data and programs that may be executed by the processor and that allow the MS to perform all functions necessary to operate in communication system 100.

User interface 402 provides a user of the MS with the capability of interacting with the MS, including inputting instructions into the MS. In one embodiment of the present invention, user interface 402 may include a display screen 404 and a keypad that includes multiple keys, including a Push-to-Talk (PTT) key, that may be used by a user of the MS to input instructions into the MS. In another embodiment of the present invention, display screen 404 may comprise a touch screen that is able to determine a position (i.e., an X-coordinate and a Y-coordinate) of a user's touch on the touch screen and convey the position data to processor 406. Based on the position data, processor 406 then translates the user's touch into an instruction. Preferably, display screen 404 may display a "keypad" screen that comprises multiple softkeys, such as softkeys corresponding to keys on a conventional cellular telephone keypad and further including a PTT softkey.

The at least one memory device 408 further maintains a mobile ID and a PoC Address that are uniquely associated with the MS. In addition, the at least one memory device 408 further maintains a phone book comprising identifiers associated with MSs and/or talkgroups, such as PoC Addresses that are each uniquely associated with an MS, a PoC Address of a recording device of a home network serving the MS, such as recording devices 122, 142, and 162 with respect to MSs 102, 103, and 104, and talkgroup identifiers that are each uniquely associated with a talkgroup that may be engaged in a PoC communication session. The PoC Addresses and talkgroup identifiers may be preprogrammed into the at least one memory device 408 or may be added to the at least one memory device by a user of the MS. When the MS is a member of a talkgroup, such as talkgroup 105, the at least one memory device 408 may further store, in association with the talkgroup identifier, an associated list of PoC Addresses, wherein each PoC Address in the list of PoC Addresses corresponds to an MS that is a member of the talkgroup.

The embodiments of the present invention preferably are implemented within each of MSs 102-104, recording devices 122, 142, and 162, and PoC Servers 120, 140, 160, and 170, and more particularly with or in software programs and instructions stored in the at least one memory devices 408, 304, 204 and executed by the processors 406, 302, 202 of the MSs, recording devices, and PoC Servers. However, one of ordinary skill in the art realizes that the embodiments of the present invention alternatively may be implemented in hardware, for example, integrated circuits (ICs), application specific integrated circuits (ASICs), and the like, such as ASICs implemented in one or more of MSs 102-104, VMs 122, 142, and 162, and PoC Servers 120, 140, 160, and 170, and all references to 'means for' herein may refer to any such implementation of the present invention. Based on the present disclosure, one skilled in the art will be readily capable of producing and implementing such software and/or hardware without undo experimentation.

Preferably, communication system 100 is a packet switched CDMA (Code Division Multiple Access) communication system, such as a CDMA 2000 1XEV-DO (1X Evolution Data Only), a CDMA 2000 1XEV-DV (1X Evolution Data and Voice) or a packet switched CDMA 1XRTT (1X Radio Transmission Technology) communication system, that includes PoC capabilities. To ensure compatibility, radio system parameters and call processing procedures are specified by the standards, including call processing steps that are executed by an MS and a base station serving the MS and between the BS and associated infrastructure in order to establish a call or execute a handoff. However, those who are of ordinary skill in the art realize that communication system 100 may operate in accordance with any one of a variety of wireless packet data communication systems capable of providing PoC services, such as but not limited to a General Packet Radio Service (GPRS) communication system, a Universal Mobile Telecommunication System (UMTS) communication system, a Wireless Local Area Network (WLAN) communication system as described by the IEEE (Institute of Electrical and Electronics Engineers) 802.xx standards, for example, the 802.11, 802.15, 802.16, or 802.20 standards, or Fourth Generation (4G) communication systems such as an Orthogonal Frequency Division Multiple Access (OFDM) communication system.

Figure 5:
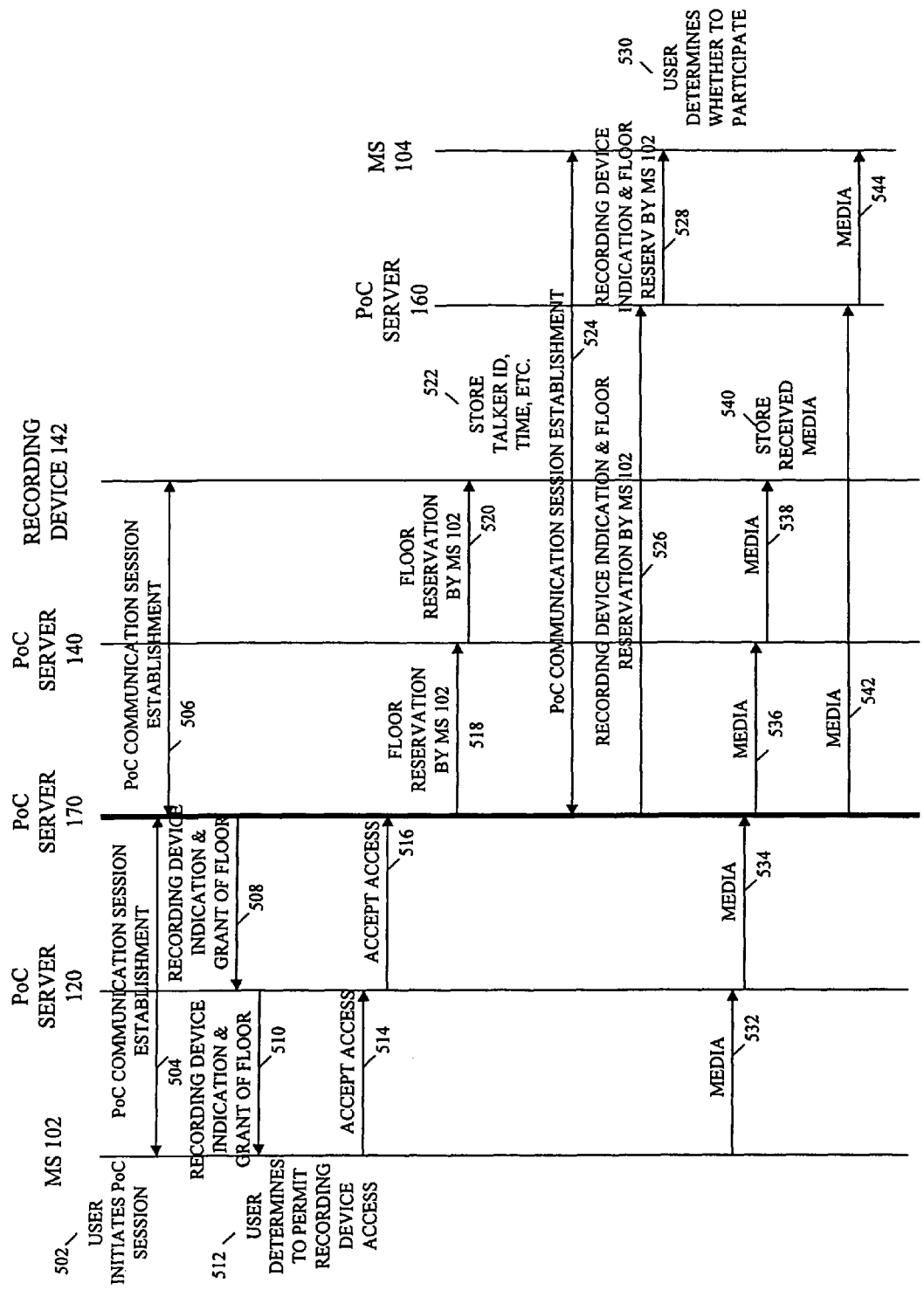
FIG. 5 is a signal flow diagram of a method executed by the communication system of FIG. 1 in implementing a PoC communication session in accordance with various embodiments of the present invention.

Referring now to FIG. 5, a signal flow diagram 500 is provided that illustrates an establishment of a PoC communication session in accordance with various embodiments of the present invention. A PoC communication session may be set up by any MS 102-104 in communication system 100 with any other PoC-enabled MS or any group of PoC-enabled MSs in the communication system. For example, any PoC-enabled MS 102-104 in communication system 100 may set up a PoC communication session with any other PoC-enabled MS in the communication system. The PoC communication session may be a one-on-one call, may be a group call intended for an Ad Hoc talkgroup, such as MS 102 inviting each of MSs 103 and 104 to participate in a group call, or may be a group call intended for a predefined talkgroup, such as talkgroup 105. In the embodiment of the invention depicted in signal flow diagram 500, a participant who is invited to participate a PoC communication session has re-routed his or her PoC calls to a recording device. A host of the PoC communication session is notified that a recoding device is participating in the communication session and determines to permit the recording device access to the communication session. Other participants in the communication session are also informed of the presence of the recording device.

Signal flow diagram 500 begins when a user of a first, host MS, such as MS 102, instructs (502) the MS to initiate a PoC communication session. Typically, a user of an MS, such as MS 102, instructs the MS to initiate a PoC communication session by depressing a PTT key in a user interface 402 of the MS or by selecting a PTT softkey on a display screen 404 of the MS. The user further identifies one or more target MSs for the communication session. For example, the user may select a PoC Address associated with each of one or more target MSs, such as MSs 103 and 104, from a menu of multiple PoC Addresses displayed on display screen 404. By way of another example, the user may select an identifier associated with a talkgroup of which the host MS is a member and which talkgroup includes one or more of target MSs 103 and 104, such as talkgroup 105, from a menu of talkgroup identifiers displayed on the display screen.

In response to receiving the instruction to initiate a PoC communication session, host MS 102 generates an invitation, for example, a SIP INVITE message, for one or more target MSs, such as MSs 103 and 104, to participate in a PoC communication session. Host MS 102 then conveys the invitation to a host PoC Server serving the MS, that is, PoC Server 120. The invitation includes a source PoC Address associated with the host MS and destination PoC Addresses associated with each target MS. However, in another embodiment of the present invention, in addition to or instead of the destination PoC Addresses, the invitation may include a talkgroup identifier that identifies the talkgroup, such as talkgroup 105, with respect to which host MS 102 desires to set up a group call.

Host PoC Server 120 routes the invitation to a controlling PoC Server, that is, PoC Server 170. In response to receiving the invitation, controlling PoC Server 170 verifies the PoC Address of host MS 102 and sets up (504) a PoC communication session with host MS 102 via host PoC Server 120. The procedure for setting up a PoC communication session is well-known in the art and will not be described in detail herein. In addition, in response to receiving the invitation, controlling PoC Server 170 identifies the one or more designated target MSs, such as MSs 103 and 104, based on the destination PoC Addresses or talkgroup identifier included in the invitation and invites each designated target MS to participate in the PoC communication session, for example, by conveying a SIP INVITE message to each target MS. When the invitation includes a talkgroup identifier instead of destination PoC Addresses, controlling PoC Server 170 may retrieve a destination PoC Address associated with each member of the talkgroup, that is, MSs 103 and 104, by reference to the GLMS. Controlling PoC Server then attempts to set up the PoC communication session with each identified target MS.

For the purpose of illustrating the principles of the present invention, it is assumed that a first target MS, such as MS 103, is unavailable for direct communications. For example, target MS 103 may have roamed outside of a coverage area of communication system 100 or may be powered down. However, target MS 103 has instructed a first target PoC Server serving the first target MS, that is, PoC Server 140, to route PoC calls intended for MS 103 to a PoC Address of a recording device associated with the target MS, that is, recording device 142. For example, the user may depress a key in a keypad of user interface 402 of the MS or select a message or icon on a display screen 404 of the user interface that corresponds to an instruction to route PoC calls to the recording device and that provides the user's access code to the recording device. Accordingly, when controlling PoC Server 170 attempts to set up the PoC communication session with target MS 103, target PoC Server 140 re-directs the call to recording device 142. In another embodiment of the invention, instead of identifying target MS 103 in the initial invitation, host MS 102 later may invite target MS 103 to participate in the communication session, in response to which controlling PoC Server 170 attempts to add MS 103 to the PoC communication session and is re-directed to recording device 142. A communication session is then set up (506) between controlling PoC Server 170 and recording device 142 via target PoC Server 140 in accordance with well known techniques.

As part of the set up of the communication session between controlling PoC Server 170 and recording device 142, one of target PoC Server 140 and recording device 142 provides controlling PoC Server 170 with the PoC Address associated with the recording device. Based on the provided destination identifier, controlling PoC Server 170 is able to determine that the communication session has been re-routed to a recording device. For example, controlling PoC Server 170 may compare the target PoC Address provided by host MS 102 to the destination PoC Address returned to controlling PoC Server 170 by target PoC Server 140. When they differ, controlling PoC Server 170 may conclude that the call has been re-routed to a recording device.

In response to determining that a recording device has been added to the communication session, controlling PoC server 170 notifies (508, 510) host MS 102 that a recording device is participating in the session. PoC Server 170 further notifies (508, 510) host MS 102 that a floor of the communication session is granted to MS 102. Controlling PoC Server 170 may communicate this information as part of the signaling exchanged during establishment of the communication session or as part of an exercise of floor control by the Server. For example, controlling PoC server 170 may notify MS 102 of the recording device and the floor grant by conveying, to the MS via host PoC Server 120, a floor control message granting a floor of the communication session, such as a Talk Burst Confirm message, that is modified to include an extension comprising a recording device indicator that indicates that a recording device is participating in the communication session.

In response to receiving the notification that a recording device is participating in the communication session, host MS 102 alerts (512) the user of the MS to the participation of the recording device. For example, processor 406 of MS 102 may retrieve a textual message from at least one memory device 408 that informs that a recording device is participating in the communication session and display the message in user interface 402. By way of another example, processor 406 of MS 102 may retrieve an audio alert from at least one memory device 408 and play the audio alert, instead of or in addition the textual message, to the user of the MS. Further, in response to receiving the notification, MS 102 alerts the user of the MS that the user may begin speaking, preferably by playing a Talk Permit Tone (TPT) to the user.

In response to the alert, the user of MS 102 determines (512) whether to permit recording device 142 access to the communication session. When the user determines to permit recording device 142 access to the communication session, the user indicates (512) his or her permission to MS 102. For example, the user may depress a corresponding key in the keypad of user interface 402 or may touch a corresponding message or icon displayed on display screen 404. In response to receiving permission for recording device 142 to participate in the communication session, MS 102 assembles a message informing of the user's acceptance of access for the recording device, that is, recording device 142, to the communication session. MS 102 then conveys (514, 516) the accept access message to controlling PoC Server 170 via host PoC Server 120. For example, the accept access message may comprise a floor control message such as a Talk Burst Access message that is modified to include an extension comprising an indication of the user's acceptance of access for recording device 142. As recording device 142 has already joined the PoC session, there is no need to relay the acceptance to the recording device.

Controlling PoC server 170 informs (518, 520) recording device 142 that the floor is reserved by MS 102. For example, controlling PoC server 170 may inform of the reservation of the floor by MS 102 by conveying, to the recording device, a floor control message informing of a reservation of the floor by the MS, such as a Receiving Talk Burst message that is modified to include an extension identifying MS 102 as having reserved the floor. In response to receiving the floor reservation message, recording device 142 stores (522) an identifier associated with the grantee, that is, MS 102, a time associated with the floor reservation message, such as a time included in the message or a time associated with receipt of the message, and any other information available from the floor reservation message, and begins recording the session.

When multiple target MSs 103, 104 are identified by host MS 102 as target MSs, in response to receiving the request to initiate a PoC call from MS 102, controlling PoC Server may further set up (524) a PoC communication session with each of the other target MSs, such as a second target MS 104, via target PoC Servers, such as second target PoC Server 160, serving the other target MSs and in accordance with well known PoC call set up procedures. Controlling PoC Server 170 notifies (526, 528) each such MS, that is, MS 104, that a recording device, that is, recording device 142, is participating in the session and that host MS 102 has reserved the floor of the communication session. For example, controlling PoC Server 170 may notify MS 104 of the recording device and the floor reservation by conveying to the MS, via target PoC Server 160, a floor control message informing of a reservation of the floor by the MS and a participation of the recording device in the session. For example, controlling PoC Server 170 may convey to MS 104 a Receiving Talk Burst message that is modified to include an extension comprising a recording device indicator that indicates that a recording device is participating in the communication session and to further inform that MS 102 has the floor.

In response to receiving the notification that a recording device is participating in the communication session, target MS 104 alerts (530) the user of the MS to the participation of the recording device. If the user determines to terminate the session, the user may withdraw from participation in the session, for example, by hanging up. However, if the user determines (530) to proceed with the communication session, the user merely may ignore the alert. MS 102 then conveys (532, 534) media to controlling PoC Server 170 via host PoC Server 120 and the controlling PoC Server distributes (536, 538, 542, 544) the media to each of recording device 142 and MS 104 via respective PoC Servers 140 and 160. Recording device 142 stores (540) the received media in association with the access code assigned to MS 103 and the information stored with respect to the received floor reservation message. Signal flow diagram 500 then ends.

Figure 6:
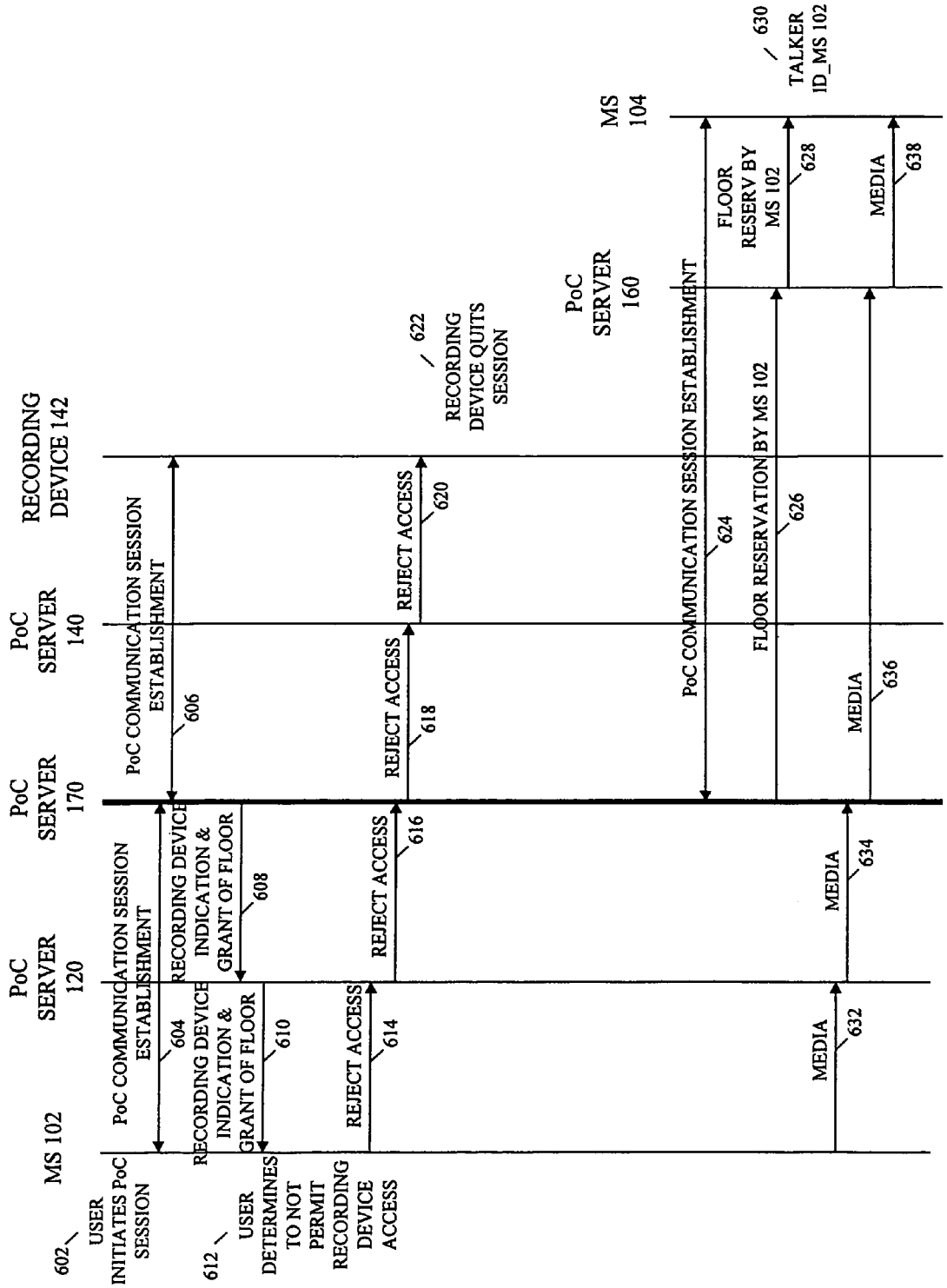
FIG. 6 is a signal flow diagram of a method an establishment of a PoC communication session in accordance with various other embodiments of the present invention.

In another embodiment of the present invention, a host of a PoC communication session may decide, in response to being informed that a recoding device is participating in the communication session, to reject an access of the recoding device to the communication session. Referring now to FIG. 6, a signal flow diagram 600 is provided that illustrates an establishment of a PoC communication session in accordance with such an embodiment of the present invention. Signal flow diagram 600 begins when a user of a first, host MS, such as MS 102, instructs (602) the MS to initiate a PoC communication session. In response to receiving the instruction to initiate the PoC communication session, host MS 102 generates an invitation, for example, a SIP INVITE message, for one or more target MSs, such as MSs 103 and 104, to participate in the PoC communication session. Host MS 102 then conveys the invitation to a host PoC Server serving the MS, that is, PoC Server 120. The invitation includes a source PoC Address associated with the host MS and destination PoC Addresses associated with each target MS. Instead of, or in addition to, the destination PoC Addresses, the invitation may include a talkgroup identifier associated with a talkgroup, such as talkgroup 105.

Host PoC Server 120 routes the invitation to a controlling PoC Server, that is, PoC Server 170. In response to receiving the invitation, controlling PoC Server 170 verifies the PoC Address of host MS 102 and sets up (604) a PoC communication session with host MS 102 via host PoC Server 120. In addition, controlling PoC Server 170 identifies the one or more designated target MSs, such as MSs 103, 104, based on the destination PoC Addresses or talkgroup identifier included in the invitation and invites each designated target MS to participate in the PoC communication session. Controlling PoC Server then attempts to set up the PoC communication session with each identified target MS.

Again, for the purpose of illustrating the principles of the present invention, it is assumed that a first target MS, that is, MS 103, is unavailable for direct communications. However, target MS 103 has instructed a first PoC Server serving the first target MS, that is, PoC Server 140, to re-route all calls intended for MS 103 to a recording device associated with the target MS, that is, recording device 142. Accordingly, when controlling PoC Server 170 attempts to set up the communication session with target MS 103, target PoC Server 140 re-directs the call to recording device 142. In another embodiment of the invention, instead of identifying target MS 103 in the initial invitation, host MS 102 later may invite target MS 103 to participate in the communication session, in response to which controlling PoC Server 170 attempts to add MS 103 to the PoC communication session and is re-directed to recording device 142. The PoC communication session is then further set up (606) between controlling PoC Server 170 and recording device 142 via target PoC Server 140 in accordance with well known techniques.

As part of the set up of the communication session between controlling PoC Server 170 and recording device 142, one of target PoC Server 140 and recording device 142 provides controlling PoC Server 170 with a destination identifier, such as a destination PoC Address, associated with recording device 142. Based on the provided destination identifier, controlling PoC Server 170 is able to determine that the communication session has been re-routed to a recording device, that is, recording device 142. Controlling PoC Server 170 grants (608, 610) the floor of the communication session to MS 102 and, in response to determining that a recording device has been added to the communication session, notifies (608, 610) host MS 102, via host PoC Server 120, that a recording device is participating in the session. For example, controlling PoC server 170 may notify MS 102 of the recording device and the floor grant by conveying a floor control message, such as a Talk Burst Confirm message, that grants a floor of the communication session and which message is modified to include an extension comprising a recording device indicator that indicates that a recording device is participating in the communication session.

In response to receiving the notification that a recording device is participating in the communication session, host MS 102 alerts (612) the user of the MS that a recording device is participating. In response to the alert, the user of MS 102 determines (612) whether to permit recording device 142 access to the communication session. When the user determines not to permit recording device 142 access to the communication session, the user indicates (612) such to MS 102. For example, the user may depress a corresponding key in the keypad of user interface 402 or may touch a corresponding message or icon displayed on display screen 404.

In response to receiving a rejection of permission for recording device 142 to participate in the communication session, MS 102 assembles a floor control message informing of the user's rejection of access of recording device 142 to the communication session. The MS then conveys (614, 616) the reject access message to controlling PoC Server 170 via host PoC Server 120. For example, the reject access message may comprise a Talk Burst Access message that is modified to include an extension comprising an indication of the user's rejection of recording device 142. Controlling PoC Server 170 forwards (618, 620) the reject access message to recording device 142 via target PoC Server 140. In response to receiving the reject access message, recording device 142 quits (622) the communication session.

When multiple target MSs 103, 104 are identified by host MS 102 as target MSs, in response to receiving the request to initiate a PoC call from MS 102, controlling PoC Server may further set up (624) the PoC communication session with each of the other target MSs, such as second target MS 104, via target PoC Servers, such as second target PoC Server 160, serving the other target MSs and in accordance with well known PoC call set up procedures. Controlling PoC Server 170 notifies (626, 628) each such MS, that is, MS 104, that host MS 102 currently reserves the floor of the communication session, preferably by conveying a floor control message to the MS via target PoC Server 160 informing of the reservation of the floor by MS 102. For example, the floor control message may comprise a Receiving Talk Burst message that is modified to include an extension identifying MS 102 as currently reserving the floor of the session. In response to receiving the floor reservation message, target MS 104 notifies (630) the user of the MS that another MS, that is, MS 102, has the floor. MS 102 then conveys (632, 634) media to controlling PoC Server 170 via host PoC Server 120 and the controlling PoC Server routes (636, 638) the media to MS 104 via PoC Server 160. Signal flow diagram 600 then ends.

Figure 7:
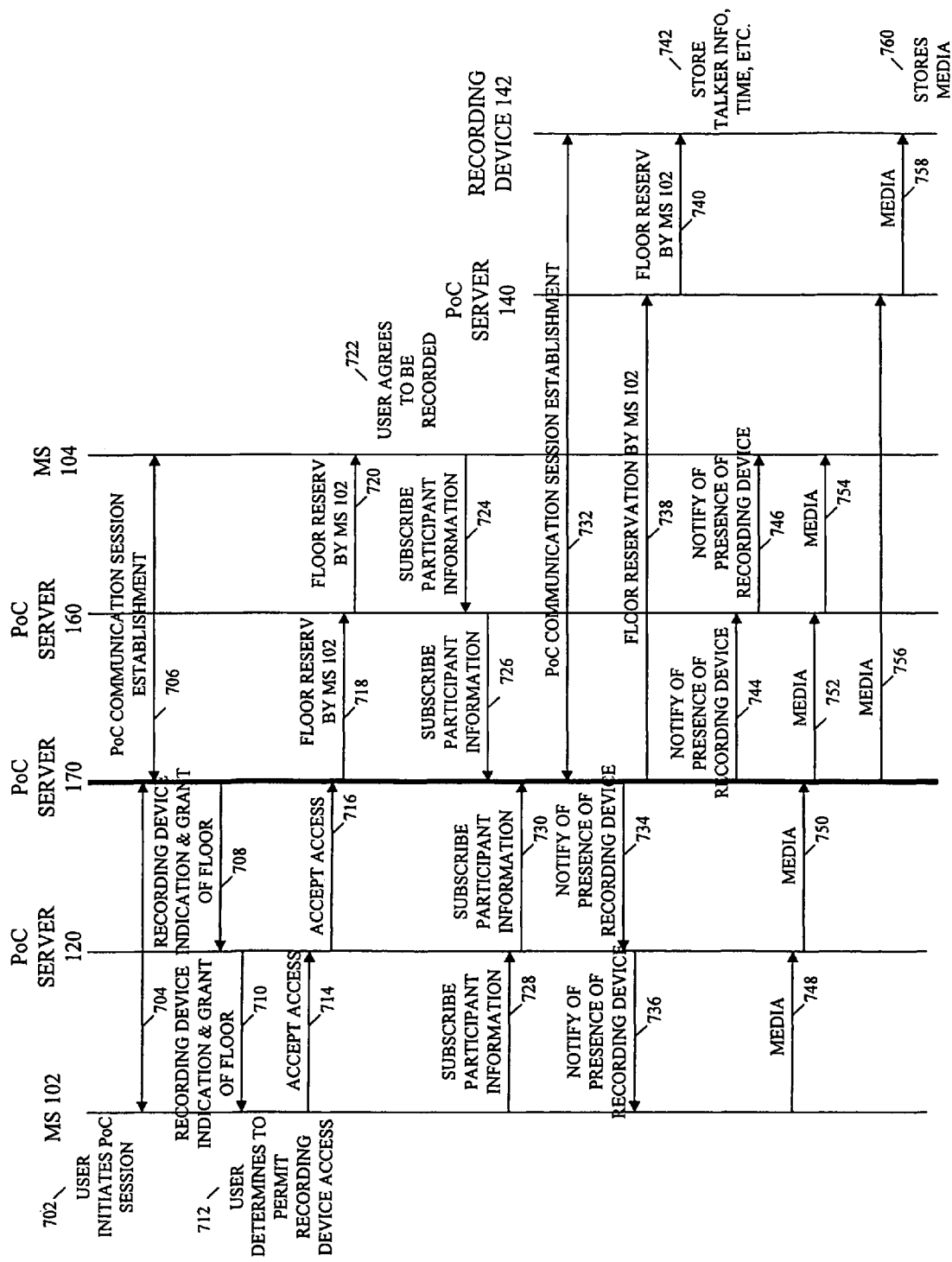
FIG. 7 is a signal flow diagram of a method an establishment of a PoC communication session in accordance with various other embodiments of the present invention.

In yet another embodiment of the present invention, multiple participants in a communication session may each agree to have their voices recorded by a recording device participating in the session. Referring now to FIG. 7, a signal flow diagram 700 is provided that illustrates an establishment of a PoC communication session in accordance with such an embodiment of the present invention. Signal flow diagram 700 begins when a user of a first, host MS, such as MS 102, instructs (702) the MS to initiate a PoC communication session. In response to receiving the instruction, host MS 102 generates a an invitation, for example, a SIP INVITE message, for multiple target MSs, such as MSs 103 and 104, to participate in the PoC communication session. Host MS 102 then conveys the invitation to a host PoC Server serving the MS, that is, PoC Server 120. The invitation includes a source PoC Address associated with the host MS and destination PoC Addresses or a talkgroup identifier associated with each target MS.

In response to receiving the invitation, host PoC Server 120 routes the invitation to a controlling PoC Server, that is, PoC Server 170. Controlling PoC Server 170 verifies the PoC Address of host MS 102 and sets up (704) a PoC call with host MS 102 via host PoC Server 120. In addition, controlling PoC Server 170 identifies the one or more designated target MSs, such as MSs 103, 104, based on the destination PoC Addresses or talkgroup identifier included in the invitation and invites each designated target MS to participate in the PoC communication session. Controlling PoC Server 170 then attempts to set up the PoC communication session with each identified target MS, that is, MSs 103 and 104, and determines, in attempting to set up the PoC communication session with the target MSs, that a recording device, such as recording device 142, will be participating in the communication session on behalf of a target MS, that is, MS 103. In another embodiment of the invention, instead of identifying target MS 103 in the initial invitation, host MS 102 later may invite target MS 103 to participate in the communication session, in response to which controlling PoC Server 170 attempts to add MS 103 to the PoC communication session and determines that recording device 142 is participating on behalf of the MS.

In response to determining that a recording device is participating in the communication session, controlling PoC server 170 notifies (708, 710) host MS 102 that a recording device is participating in the session and that the floor of the communication session is granted to MS 102. Preferably, controlling PoC server 170 notifies MS 102 of the recording device and the floor grant by conveying, to host MS 102 via host PoC Server 120, a floor control message granting a floor of the communication session, such as a Talk Burst Confirm message, which message is modified to include an extension comprising a recording device indicator that indicates that a recording device is participating in the communication session.

In response to receiving the notification that a recording device is participating in the communication session, host MS 102 alerts (712) the user of the MS to the participation of the recording device. In response to the alert, the user of MS 102 determines (712) whether to permit the recording device, that is, recording device 142, access to the communication session. When the user determines permit VM 142 access to the communication session, the user indicates (712) his or her permission to MS 102. In response to receiving permission for recording device 142 to participate in the communication session, MS 102 assembles a floor control message informing of the user's acceptance of access of the recording device, that is, recording device 142, to the communication session. MS 102 then conveys (714, 716) the accept access message to controlling PoC Server 170 via host PoC Server 120. Preferably the accept access message comprises a modified version of a Talk Burst Access message, which message is modified to include an extension comprising an indication of the user's acceptance of recording device 142.

Controlling PoC Server 170 sets up (706) the communication session with target MS 104 in accordance with well known PoC call set up techniques and notifies (718, 720) target MS 104, via the PoC Server 160 serving the MS 104, that host MS 102 has reserved the floor of the communication session and that a recording device, that is, recording device 142, is participating in the communication session. Preferably, controlling PoC server 170 notifies MS 104 of the floor reservation and recording device by conveying a floor control message to the MS via target PoC Server 160 informing of the reservation and recording device. For example, the floor control message may comprise a Receiving Talk Burst message that is modified to include an extension comprising a recording device indicator that indicates that a recording device is participating in the communication session and further informing that the floor is currently reserved by MS 102.

In response to receiving the notification that a recording device is participating in the communication session, target MS 104 alerts (722) the user of the MS to the participation of a recording device. In response to the alert, the user of target MS 104 determines (722) whether to permit the recording device, that is, recording device 142, to record communications by the user of the target MS. When the user determines to permit the recording device to record communications of the user, the user indicates (722) such to MS 104. For example, the user may depress a corresponding key in the keypad of user interface 402 or may touch a corresponding message or icon displayed on display screen 404.

In response to receiving permission from the user of target MS 104 for recording device 142 to record communications of the user, target MS 104 informs (724, 726) controlling PoC Server 170 that the target MS agrees to be recorded. Preferably, target MS 104 informs of the agreement to be recorded by assembling and conveying to controlling PoC Server 170, via serving PoC Server 160, a floor control message that informs of the participant's, that is, MS 104's, agreement to fully participate in the communication session, that is, to be recorded by recording device 142. For example, target MS 104 may assemble and convey a Subscribe Participant Information message that is modified to inform of the agreement to fully participate. Similarly, host MS 102 may also inform (728, 730) of an agreement to be recorded by assembling and conveying to controlling PoC Server 170, via host PoC Server 120, a a floor control message that informs of the participant's, that is, MS 102's, agreement to fully participate in the communication session.

When controlling PoC Server 170 sets up (732) the PoC communication session with recording device 142, the controlling PoC Server informs (734, 736, 744, 746) each of host MS 102 and target MS 104, via their respective PoC Servers 120, 160, that the recording device is now participating in the communication session. In addition, controlling PoC server 170 informs (738, 740) recording device 142 that the floor is reserved by MS 102, preferably by conveying a floor control message informing of the reservation. For example, the floor control message may comprise a Receiving Talk Burst message that is modified to include an extension identifying MS 102 as having reserved the floor. In response to receiving the floor reservation message, recording device 142 stores (742) an identifier associated with the talker, that is, MS 102, a time associated with the floor reservation message, such as a time included in the message or a time associated with receipt of the message, and any other information available in the floor reservation message, and begins recording the session.

MS 102 then conveys (748, 750) media to controlling PoC Server 170 via host PoC Server 120 and the controlling PoC Server distributes (752, 754, 756, 758) the media to each of VM 142 and MS 104 via respective PoC Servers 140 and 160. Recording device 142 stores (760) the received media in association with the access code assigned to MS 103 and the information stored with respect to the received floor reservation message. Signal flow diagram 700 then ends.

By informing a host MS of an addition of a recording device to a PoC communication session, communication system 100 allows a user of the MS to make an informed decision as to whether to permit the recording device access to the communication session. Without being so informed, the user of the host MS might otherwise be unaware of the participation of the recording device as the recording device may be participating on behalf of an MS that is invited by the host. Thus communication system 100 permits the user of the host MS to proceed with the PoC communication session either with or without the further participation of the recording device, whichever the user decides to do. Further, communication system 100 informs the user of the host MS of the participation of the recording device whenever the recording device is added to the session, regardless of whether the recording device is added when the session is initially set up or is subsequently added pursuant to a later invitation to join the session.

In addition, communication system 100 provides for an informing of other participants in the PoC communication session of the participation of the recording device, thereby permitting the other participants to make an informed decision as to participate in a communication session that is being recorded. Communication system 100 also permits the participants to indicate whether they wish the recording device to store media that they source. Further, communication system 100 provides for the recording device to store, along with conveyed media, a source and time associated with the media. Thus a user of an MS on behalf of whom the media is stored may, upon subsequently retrieving the media, better reconstruct the PoC communication session missed by the user.

Figure 8:
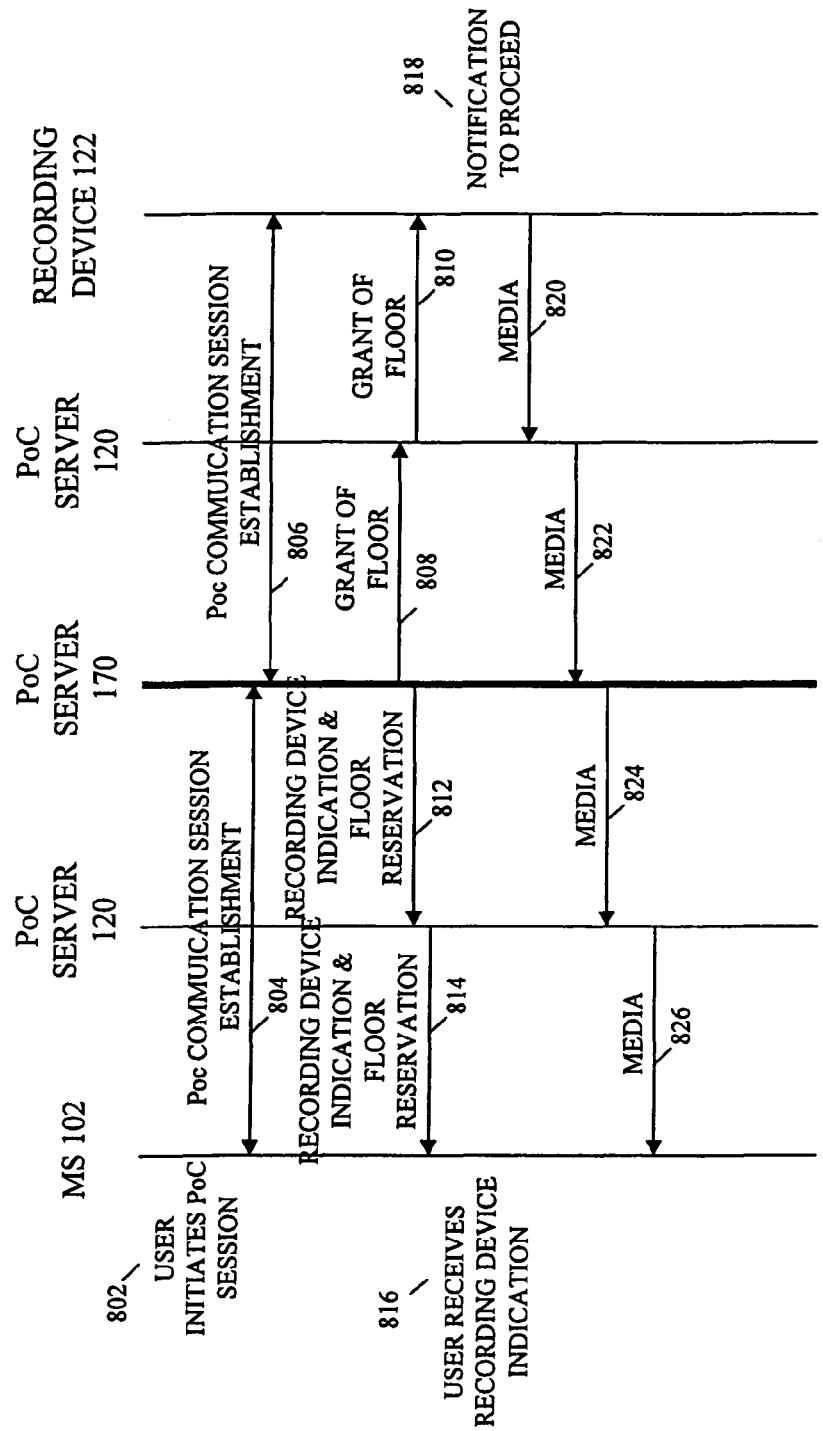
FIG. 8 is a signal flow diagram of a method by which a PoC-enabled mobile station of FIG. 1 retrieves media stored in a recording device of FIG. 1 in accordance with an embodiment of the present invention.

In regard to retrieval of the stored media, communication system 100 further provides for a user of an MS on behalf of whom the media is stored in the recording device to retrieve the stored media by setting up a PoC communication session with the recording device. Referring now to FIG. 8, a signal flow diagram 800 is provided that illustrates a method by which an MS 102-104 may retrieve media stored in a recording device 122, 142, 162 in accordance with an embodiment of the present invention. Signal flow diagram 800 begins when a user of an MS, such as MS 102, initiates (802) a PoC communication session with a home network recording device, that is, recording device 122, to retrieve stored media, such as a stored talk burst. For example, the user may depress a key or touch a softkey corresponding to an instruction to retrieve stored media from a recording device associated with the MS. In response to receiving the instruction to retrieve the stored media, host MS 102 generates a request to initiate a PoC communication session that is conveyed to a PoC Server serving the MS, that is, PoC Server 120. The request includes a source PoC Address associated with MS 102, a destination PoC Address associated with recording device 122, and an indication that this is a request to retrieve stored media.

Host PoC Server 120 routes the request to a controlling PoC Server, that is, PoC Server 170. In response to receiving the request, controlling PoC Server 170 verifies the PoC Address of MS 102 and sets up (804) a PoC communication session with host MS 102 via host PoC Server 120. In addition, controlling PoC Server 170 identifies recording device 122 based on the destination PoC Address included in the request and realizes, based on the service invoked by the request, that the floor of the PoC communication session should be granted to recording device 122.

Controlling PoC Server 170 then set ups (806) the PoC communication session with recording device 122 and grants (808, 810) the floor of the communication session to the recording device, preferably by conveying a floor control message to the recording device granting the floor to the device. For example, controlling PoC Server 170 may convey a Talk Burst Confirmation message to the recording device via home network PoC Server 120. In addition, controlling PoC Server 170 notifies (812, 814) MS 102, via via host PoC Server 120, that a recording device, that is, recording device 122, is participating in the session and that the floor of the communication session is currently reserved by the recording device. Preferably, controlling PoC Server 170 conveys a floor control message informing of the floor reservation and the recording device, such as a Receiving Talk Burst message that is modified to include an extension comprising a recording device indicator that indicates that a recording device is participating in the communication session.

In response to receiving the notification that a recording device, that is, recording device 122, is participating in the communication session, host MS 102 alerts (816) the user of the MS to the participation of the recording device. In response to being informed that it is granted the floor, recording device 122 determines (818) to proceed. Recording device 122 queries MS 102 for the access code associated with a storage location of the MS's media, such as a voice mailbox, and retrieves the media stored on behalf of MS 102 along with other, associated stored information. Recording device 122 then conveys (820, 822) the retrieved media and information to controlling PoC Server 170 via home PoC Server 120 and the controlling PoC Server routes (824, 826) the media and information to MS 102 via home PoC Server 120. Signal flow diagram 800 then ends.

Figure 9:
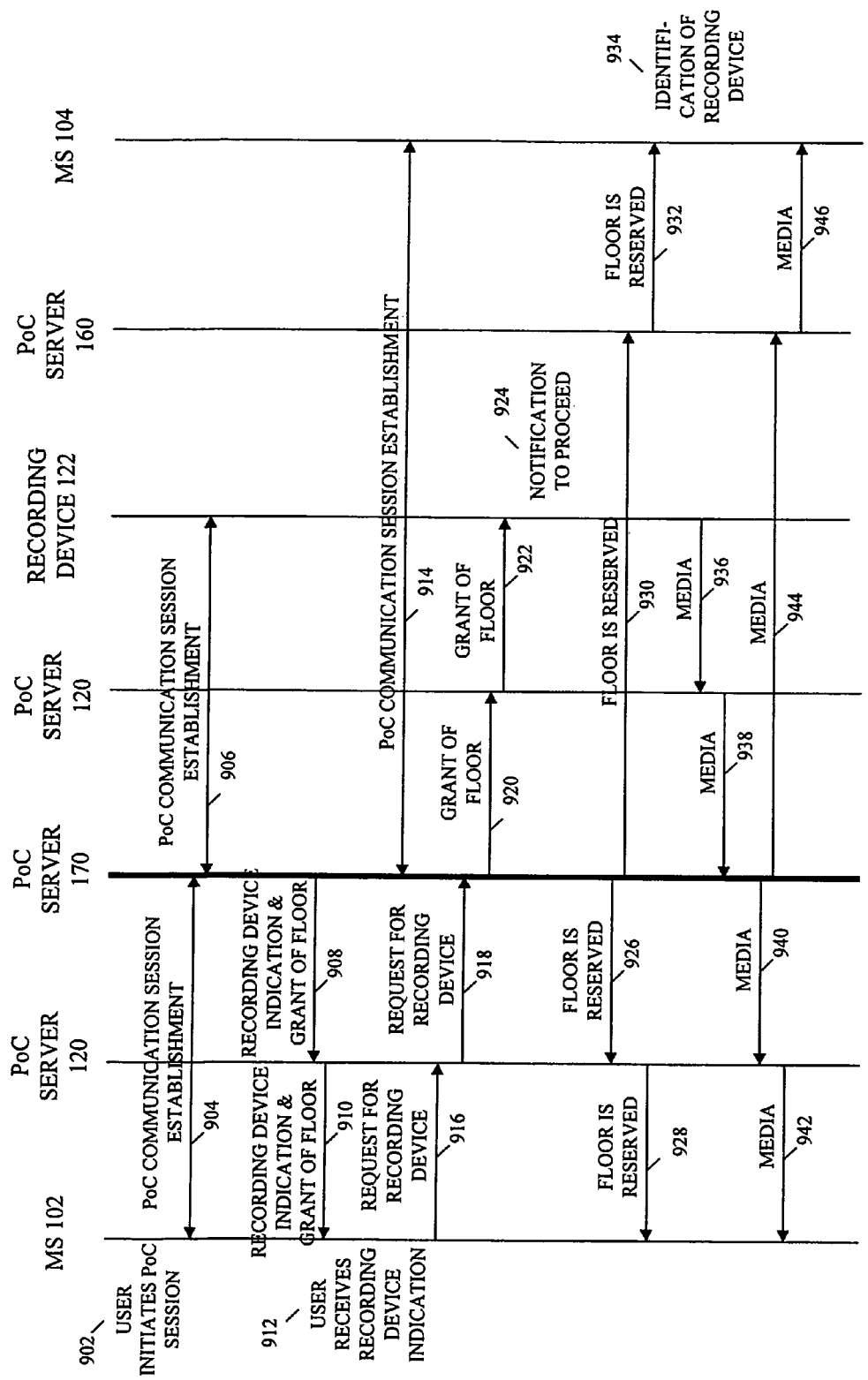
FIG. 9 is a signal flow diagram of a method by which a PoC-enabled mobile station of FIG. 1 retrieves media stored in a recording device of FIG. 1 in accordance with another embodiment of the present invention.

In another embodiment of the present invention, after media is stored in a recording device on behalf of an MS, the MS may retrieve the media from the recording device during a PoC communication session with another MS, for example, during a group call. Thus other members of the group, besides a host MS, are able to review the media stored on the recording device. FIG. 9 is a signal flow diagram 900 of a method by which an MS 102-104 retrieves media stored in a recording device 122, 142, 162 in accordance with such an embodiment of the present invention. Signal flow diagram 900 begins when a user of an MS, such as MS 102, initiates (902) a PoC communication session with a home network recording device, that is, recording device 122, and at least one target MS, such as MS 104. In response to receiving the instruction to initiate a PoC communication session, host MS 102 generates an invitation, for example, a SIP INVITE message, for recording device 122 and a target MS, such as MS 104, to participate in a PoC communication session. Host MS 102 then conveys the invitation to a host PoC Server serving the MS, that is, PoC Server 120. The invitation includes a source PoC Address associated with the host MS and destination PoC Addresses and/or a talkgroup identifier associated with recording device 122 and each target MS, that is, MS 104.

Host PoC Server 120 routes the invitation to a controlling PoC Server, that is, PoC Server 170. In response to receiving the invitation, controlling PoC Server 170 verifies the PoC Address of host MS 102, identifies recording device 122, and sets up (904, 906) a PoC communication session with each of recording device 122 and host MS 102 via host PoC Server 120 in accordance with well known PoC call set up techniques. Controlling PoC Server 170 further sets up (914) a PoC communication session with target MS 104 via a PoC Server 160 serving the target MS in accordance with well known call set up techniques. However, in another embodiment of the invention, instead of identifying recording device 122 in the initial invitation, host MS 102 later may invite the recording device to participate in the communication session, in response to which controlling PoC Server 170 attempts to add the recording device.

Controlling PoC Server 170 grants (908, 910) the floor of the communication session to host MS 102 and informs the host MS of the participation of a recording device, that is, recording device 122. Preferably, controlling PoC Server 170 conveys a floor control message to MS 102, via home network PoC Server 120, that grants the floor and informs of the participation of a recording device. For example, controlling PoC Server 170 may convey a Talk Burst Confirmation message that is modified to include an extension comprising a recording device indicator that indicates that a recording device is participating in the communication session.

In response to receiving the notification that a recording device is participating in the communication session, host MS 102 alerts (912) the user of the MS to the participation of the recording device. In response to the alert, the user of MS 102 instructs MS 102 to pass control of the floor of the communication session to recording device 122. For example, the user may depress a corresponding key in the keypad of user interface 402 or may select a corresponding message or icon displayed on display screen 404. In response to receiving the instruction, MS 102 assembles and conveys (916, 918) to controlling PoC Server 170, via host PoC Server 120, a floor control message requesting to pass control of the floor to recording device 122. For example, the floor control message may comprise a Talk Burst Request message that is modified to identify recording device 122 as the entity to whom floor control should be passed.

In response to receiving the request to pass control of the floor, controlling PoC Server 170 grants (920, 922) the floor of the communication session to recording device 122. Preferably, controlling PoC Server 170 grants control by conveying a floor control message, such as a Talk Burst Confirmation message, to the recording device via home network PoC Server 120. Controlling PoC Server 170 further informs (926, 928, 930, 932) each of host MS 102 and target MS 104 that the floor of the communication session is currently reserved by the recording device. Preferably, controlling PoC Server 170 conveys to each of host MS 102 and target MS 104, via respective PoC Servers 120 and 160, a floor control message informing of the floor reservation, such as a Receiving Talk Burst message, that is modified to include an extension comprising a recording device indicator that indicates that the floor is reserved by recording device 122. In response to receiving the modified Receiving Talk Burst message, MS 104 alerts (934) the user of the MS that the floor has been reserved to a recording device.

In response to being informed that it has the floor, recording device 122 queries MS 102 for the access code associated with a storage location of the MS's media, such as a voice mailbox. Recording device 122 retrieves the stored media and other, associated, stored information and conveys (936, 938) the retrieved media and information to controlling PoC Server 170 via home PoC Server 120. Controlling PoC Server distributes (940, 942, 944, 946) the media and information to host MS 102 via home PoC Server 120 and to target MS 104 via PoC Server 160, and signal flow diagram 900 ends.

Figure 10:
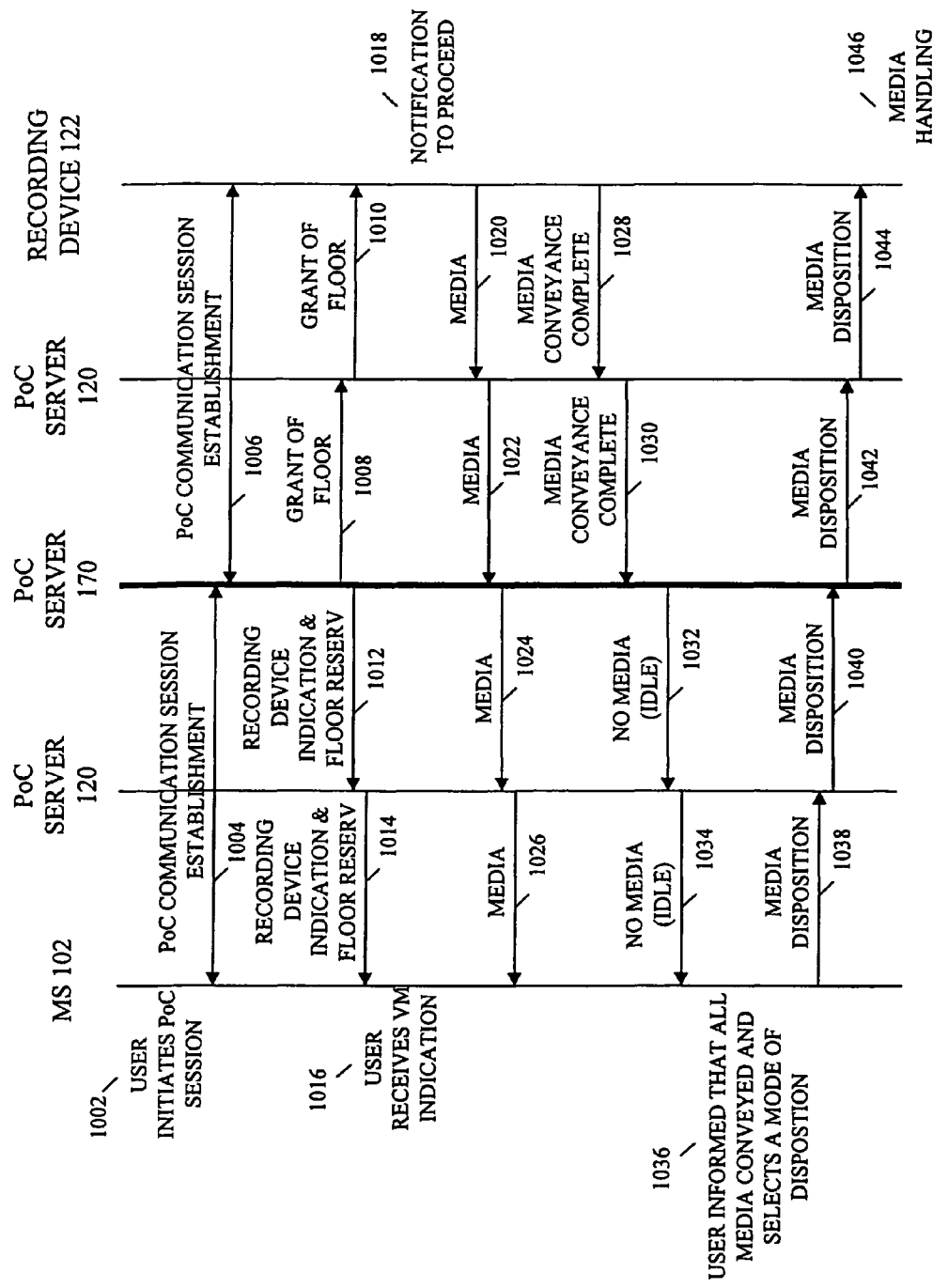
FIG. 10 is a signal flow diagram of a method by which a PoC-enabled mobile station of FIG. 1 retrieves and handles media stored in a recording device of FIG. 1 in accordance with another embodiment of the present invention.

In yet another embodiment of the present invention, after media is stored in a recording device on behalf of an MS, the MS may retrieve the stored media from the recording device by setting up a PoC communication session with the recording device and further manage a disposition of the stored media at the recording device. FIG. 10 is a signal flow diagram 1000 of a method by which an MS 102-104 retrieves and handles media stored in a recording device 122, 142, 162 in accordance with such an embodiment of the present invention. Similar to signal flow diagram 800, signal flow diagram 1000 begins when a user of a host MS, such as MS 102, initiates (1002) a PoC communication session with a home network recording device, that is, recording device 122, to retrieve media stored on behalf of the MS. In response to receiving the instruction, host MS 102 generates a request to initiate a PoC call that is conveyed to a PoC Server serving the MS, that is, PoC Server 120. The request includes a source PoC Address associated with MS 102, a destination PoC Address associated with recording device 122, and an indication that this is a request to retrieve stored media.

Host PoC Server 120 routes the request to a controlling PoC Server, that is, PoC Server 170. In response to receiving the request, controlling PoC Server 170 verifies the PoC Address of MS 102 and sets up (1004) a PoC communication session with host MS 102 via host PoC Server 120. In addition, controlling PoC Server 170 identifies recording device 122 based on the destination PoC Address included in the request and realizes, based on the service invoked by the request, that the floor of the PoC communication session should be granted to recording device 122.

Controlling PoC Server 170 then set ups (1006) the PoC communication session with recording device 122 and grants (1008, 1010) the floor of the communication session to recording device 122, preferably by conveying a floor control message granting the floor. For example, controlling PoC Server 170 may convey a Talk Burst Confirmation message to the recording device via home network PoC Server 120. In addition, controlling PoC Server 170 notifies (1012, 1014) MS 102 that a recording device, that is, recording device 122, is participating in the session and that the floor of the communication session is currently reserved by the recording device, preferably by conveying a floor control message notifying of the floor reservation and recording device participation. For example, controlling PoC Server 170 may convey to MS 102, via host PoC Server 120, a Receiving Talk Burst message that is modified to include an extension comprising a recording device indicator that indicates that a recording device is participating in the communication session.

In response to receiving the notification that a recording device is participating in the communication session, host MS 102 alerts (1016) the user of the MS to the participation of the recording device. In response to being informed that it has the floor, recording device 122 determines (1018) to proceed and queries MS 102 for the access code associated with a storage location of the MS's media, such as a voice mailbox. Recording device 122 retrieves the stored media and other, associated stored information and conveys (1020, 1022, 1024, 1026) the retrieved media and information to MS 102 via home PoC Server 120 and controlling PoC Server 170.

When recording device 122 finishes conveying all media and other information stored in the recording device in association with MS 102, the recording device indicates (1028, 1030) to controlling PoC Server 170, via host PoC Server 120, that the recording device has no further media to convey. Preferably, recording device 122 indicates that the recording device has no further media to convey by conveying a floor control message indicating that the conveyance is complete, such as Talk Burst Complete message. In response to receiving the indication from recording device 122, controlling PoC Server 170 indicates (1032, 1034) to MS 102, via host PoC Server 120, that the recording device has no further media to convey, for example, by conveying one or more IDLE frames to MS 102. The IDLE frames are an indication that recording device 122 has completed the conveyance of stored media and information.

In response to receiving the IDLE frames, MS 102 informs (1036) the user of the MS that the conveyance of stored media is complete. The user of the MS may then instruct (1036) the MS as to the disposition of the stored media. For example, the user may depress a key in the keypad of user interface 402 or may select a message or an icon displayed on display screen 404 corresponding to an instruction associated with a desired mode of disposing of the stored media. For example, the user may instruct the MS to instruct recording device 122 to delete the stored media from the recording device, to maintain the stored media in the recording device, to replay the stored media, to skip a stored message or a portion of the stored media, and/or to otherwise handle the stored media in any other manner that may occur to one of ordinary skill in the art. In response to receiving the instruction from the user of the MS, MS 102 assembles and conveys (1038, 1040, 1042, 1044) an instruction to recording device 122, via host PoC Server 120 and controlling PoC Server 170, informing of a desired disposition of the stored media. Preferably the instruction is conveyed via a floor control message that identifies the type of media/message disposition selected by the user of MS 102, such as a Talk Burst Disposition message. When recording device 122 receives (1044) the instruction from MS 102, recording device 122 disposes (1046) of the media as instructed by the instruction and signal flow 1000 ends.

Thus communication system 100 provides for an informing of participants to a PoC communication session that the session is being recorded by a recording device, for a storage, by the recording device, of media that conveyed during the session, and for a subsequent retrieval of the stored media from the recording device. The host of the communication session is permitted to determine whether or not the recording device is permitted access to the communication session, and the other participants in the session are able to determine whether to remain in the session when the recording device is permitted access.

Communication system 100 further provides for a user of an MS on behalf of whom the recording device is participating to retrieve the stored media along with information identifying a source of the media and a time associated with the storage of the media. Thus the user is better able to reconstruct the PoC communication session missed by the user. The user of the MS associated with the recording device may retrieve the information during a one-on-one PoC communication session with the recording device or during a group call, thereby permitting others to review the stored media when it is retrieved. Further, communication system 100 provides for the user of the MS associated with the recording device to dispose of the stored media as the the user sees fit, for example, to delete the stored media from the recording device, to maintain the stored media in the recording device, to replay the stored media, and/or to skip a stored message or a portion of the stored media.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for establishing a Push-to-Talk over Cellular (PoC) communication session in a wireless communication system comprising:
    receiving a request by a host mobile station to invite a target mobile station to a PoC communication session;
    establishing the PoC communication session with the host mobile station and with a recording device associated with the target mobile station;
    informing the host mobile station that the recording device has been added to the PoC communication session prior to the recording device being permitted access to the communication session;
    receiving, from the host mobile station, an acceptance or a rejection of access of the recording device to the PoC communication session
    establishing the Push-to-Talk over Cellular (PoC) communication session with a target mobile station; and
    informing the target mobile station that the recording device has been added to the PoC communication session, wherein informing the target mobile station that the recording device has been added to the Push-to-Talk over Cellular (PoC) communication session comprises conveying a Receiving Talk Burst message to the target mobile station that comprises an indication that a recording device is participating in the communication session.

2. The method of claim 1, wherein informing comprises conveying a Talk Burst Confirm message to the host mobile station that comprises an indication that a recording device is participating in the communication session.

3. The method of claim 1, wherein receiving an acceptance or a rejection of access of the recording device to the Push-to-Talk over Cellular communication session comprises receiving a Talk Burst Access message having an extension comprising an indication of an acceptance or a rejection of access of the recording device.

4. The method of claim 1, further comprising:
    granting the host mobile station a reservation of a floor of the communication session in response to receiving an acceptance of access of the recording device to the Push-to-Talk over Cellular communication session; and
    informing the recording device that the floor of the communication session is reserved by the host mobile station.

5. The method of claim 1, further comprising, in response to receiving a message informing that the host mobile station has rejected access of the recording device to the communication session, quitting, by the recording device, the Push-to-Talk over Cellular communication session.

6. The method of claim 1, further comprising:
    establishing the Push-to-Talk over Cellular communication session with a target mobile station;
    receiving an agreement, from the host mobile station, to be recorded; and
    receiving an agreement, from the target mobile station, to be recorded.

7. A method for wirelessly retrieving media stored as part of a Push-to-Talk over Cellular (PoC) communication session in a wireless communication system comprising:
    receiving a request by a host mobile station to invite a recording device to a PoC communication session;
    establishing the PoC communication session with the host mobile station and with the recording device, wherein the recording device is capable of storing media in association with the host mobile station;
    granting a floor of the PoC communication session to the host mobile station;
    receiving, from the host mobile station, a request to pass the floor of the PoC communication session to the recording device;
    in response to receiving the request, granting the floor of the PoC communication session to the recording device;
    informing the host communication device that the recording device has been added to the Push-to-Talk over Cellular communication session prior to conveying the stored media to the host communication device;
    receiving the stored media from the recording device;
    forwarding the stored media to the host mobile station
    establishing the Push-to-Talk over Cellular communication session with a target mobile station; and
    forwarding the stored media to the target mobile station.

8. The method of claim 7, wherein informing comprises conveying a Talk Burst Confirm message to the host mobile station that comprises one or more of an indication that a recording device is participating in the communication session and an indication that the floor of the communication session is reserved by the recording device.

9. The method of claim 7, further comprising:
    receiving an indication from the recording device that the recording device has no further media to convey;
    in response to receiving the indication from the recording device, indicating to the host mobile station that the recording device has no further media to convey;
    receiving, from the host mobile station, an instruction concerning a disposition of the stored media; and
    forwarding the instruction to the recording device.

10. A Push-to-Talk over Cellular (PoC) Server comprising:
    means for receiving a request by a host mobile station to invite a target mobile station to a PoC communication session;
    means for establishing the PoC communication session with the host mobile station and with a recording device associated with the target mobile station;
    means for informing the host mobile station that the recording device has been added to the PoC communication session prior to the recording device being permitted access to the communication session;
    means for receiving, from the host mobile station, an acceptance or a rejection of access of the recording device to the PoC communication session
    means for establishing the PoC communication session with a target mobile station; and
    means for informing the target mobile station that the recording device has been added to the PoC communication session, wherein the means for informing the target mobile station that the recording device has been added to the PoC communication session comprises a means for conveying a Receiving Talk Burst message to the target mobile station that comprises an indication that a recording device is participating in the communication session.

11. The Push-to-Talk over Cellular Server of claim 10, wherein the means for informing comprises:
- means for assembling a Talk Burst Confirm message that comprises an indication that a recording device is participating in the communication session; and
- means for conveying the Talk Burst Confirm message to the host mobile station.

12. The Push-to-Talk over Cellular Server of claim 10, wherein the means for receiving an acceptance or a rejection of access of the recording device to the Push-to-Talk over Cellular communication session comprises means for receiving a Talk Burst Access message having an extension that comprises an indication of an acceptance or a rejection of access of the recording device.

13. The Push-to-Talk over Cellular (PoC) of claim 10, further comprising:
- means for granting the host mobile station a reservation of a floor of the communication session in response to receiving an acceptance or a rejection of access of the recording device to the PoC communication session; and
- means for informing the recording device that the floor of the communication session is reserved by the host mobile station.

14. The Push-to-Talk over Cellular Server of claim 13, wherein the means for informing of the floor reservation comprises:
- means for assembling a Receiving Talk Burst message that informs that the floor of the communication session is reserved by the host mobile station; and
- means for conveying the Receiving Talk Burst message to the recording device.

15. The Push-to-Talk over Cellular (PoC) Server of claim 10, further comprising:
- means for establishing the PoC communication session with a target mobile station;
- means for receiving an agreement, by the host mobile station, to be recorded; and
- means for receiving an agreement, by the target mobile station, to be recorded.

16. A Push-to-Talk over Cellular (PoC) Server comprising:
- means for receiving a request by a host mobile station to invite a recording device to a PoC communication session;
- means for establishing the PoC communication session with the host mobile station and with the recording device, wherein the recording device is capable of storing media in association with the host mobile station;
- means for granting a floor of the PoC communication session to the recording device;
- means for informing the host communication device that the recording device has been added to the PoC communication session prior to conveying the stored media to the host communication device;
- means for receiving the stored media from the recording device;
- means for forwarding the stored media to the host mobile station
- means for receiving an indication from the recording device that the recording device has no further media to convey;
- means for, in response to receiving the indication from the recording device, indicating to the host mobile station that the recording device has no further media to convey;
- means for receiving, from the host mobile station, an instruction concerning a disposition of the stored media; and
- means for forwarding the instruction to the recording device.

17. The Push-to-Talk over Cellular Server of claim 16, wherein the means for informing comprises:
- means for assembling a Talk Burst Confirm message that comprises an indication that a recording device is participating in the communication session; and
- means for conveying the Talk Burst Confirm message to the host mobile station.

18. The Push-to-Talk over Cellular Server of claim 17, wherein the means for assembling a Talk Burst Confirm message comprises means for assembling a Talk Burst Confirm message that comprises an indication that a recording device is participating in the communication session and that further informs that the floor of the communication session is reserved by the recording device.

19. The Push-to-Talk over Cellular (PoC) Server of claim 16, further comprising:
- means for establishing the PoC communication session with a target mobile station; and
- means for forwarding the stored media to the target mobile station.

20. The Push-to-Talk over Cellular (PoC) Server of claim 19, wherein granting a floor comprises:
- means for granting a floor of the PoC communication session to the host mobile station;
- means for receiving, from the host mobile station, a request to pass the floor of the communication session to the recording device; and
- means for, in response to receiving the request, granting the floor of the PoC communication session to the recording device.

21. The Push-to-Talk over Cellular Server of claim 20, further comprising means for informing each of the host mobile station and the target mobile station that the floor is reserved by the recording device.

* * * * *

UNITED STATES PATENT AND TRADEMARK OFFICE
CERTIFICATE OF CORRECTION

PATENT NO.       : 8,010,142 B2  
APPLICATION NO.  : 11/338016  
DATED            : August 30, 2011  
INVENTOR(S)      : Wild et al.

Page 1 of 1

It is certified that error appears in the above-identified patent and that said Letters Patent is hereby corrected as shown below:

In Column 21, Line 16, in Claim 13, delete "(PoC)" and insert -- (PoC) Server --, therefor.

Signed and Sealed this  
First Day of January, 2013

David J. Kappos  
*Director of the United States Patent and Trademark Office*